(No Model.)
B. TORMEY.
CORK EXTRACTOR.
No. 441,604. Patented Nov. 25, 1890.
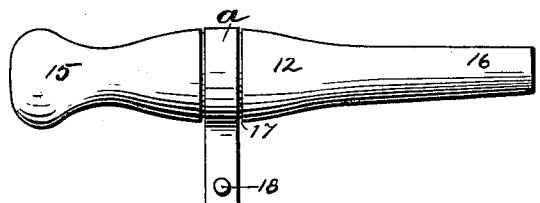
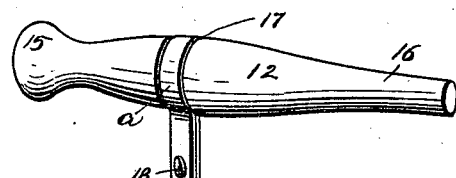
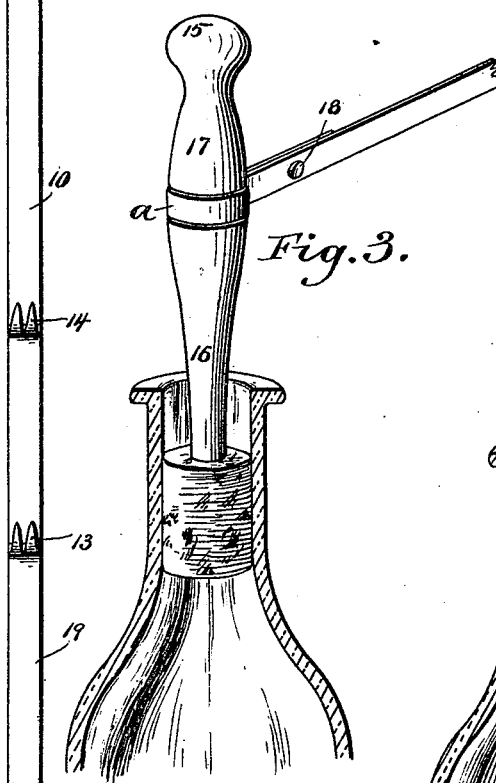
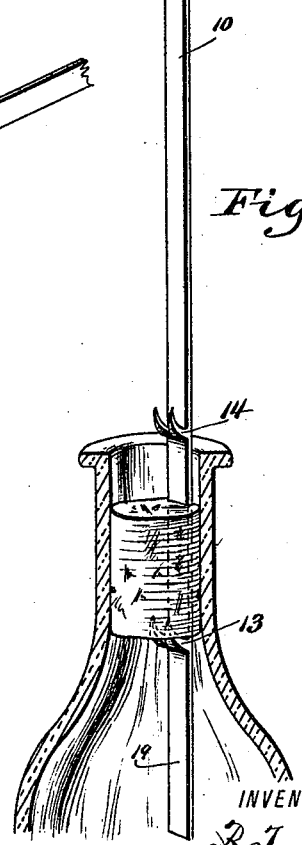
WITNESSES:
INVENTOR: B. Tormey
BY Munn & Co
ATTORNEYS

UNITED STATES PATENT OFFICE.

BERNARD TORMEY, OF NEW YORK, N. Y.

CORK-EXTRACTOR.

SPECIFICATION forming part of Letters Patent No. 441,604, dated November 25, 1890.

Application filed August 5, 1890. Serial No. 361,071. (No model.)

*To all whom it may concern:*

Be it known that I, BERNARD TORMEY, of New York city, in the county and State of New York, have invented a new and useful Improvement in Cork-Extractors, of which the following is a full, clear, and exact description.

My invention relates to an improved cork-extractor, and has for its object to provide a device especially useful in drawing corks from the interior of vessels made from or covered with a non-transparent material—such as jugs, demijohns, &c.—which device will be simple, durable, and capable of removing one or more corks from the vessel at one operation.

A further object of the invention is to so construct the device that the danger of breaking the cork in the act of withdrawing the same will be reduced to a minimum, and to so shape the handle of the device that it may be utilized to press a cork lodged in an unfavorable position in the neck of a bottle so that it will be forced downward into the body of said bottle to enable it to be readily extracted.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a side elevation of the device. Fig. 2 is a perspective view thereof, illustrating the device in the act of withdrawing a cork; and Fig. 3 is a perspective view of a portion of the device, illustrating the adaptation of the handle for forcing a cork from the neck of a bottle.

The body 10 of the device consists of a flat strip of, preferably, spring metal, the upper end whereof is looped over a handle 12, as illustrated at $a$ in the drawings; or the upper end of the body may be attached to the handle in any suitable or approved manner. Some distance from the lower end of the body upon one side of the same outwardly and upwardly extending claws 13 are formed, preferably two in number, which claws are in horizontal alignment and are arranged transversely of the body, and above the claws 13 another set of claws 14, similar to claws 13, are arranged. The claws 13 and 14 may be formed either integral with the body or may be attached thereto, as in practice may be found most desirable. The handle 12 is of peculiar shape, being formed at one end with a head 15, the opposite end being made tapering from the center outward, as illustrated at 16, and in the central peripheral surface of the handle a channel 17 is formed to receive the loop $a$ of the body when such a loop is employed. When the loop construction of the body is used, the end of the body carried over the handle is firmly secured to the body beneath the handle by means of a rivet 18 or equivalent device, and the united portions of the body are in vertical alignment with the center of the handle.

In operation, the body of the device is inserted into the vessel, and the cork therein will be engaged by the claws, and when so engaged the said cork may be drawn upward and out through the neck of the bottle or other vessel without breaking the cork, as illustrated in Fig. 2. Were the claws located at the lower end of the body in drawing the cork the cork would have no guide or bearing upon the device below the claw, and consequently the cork would be liable to be turned inward and a portion of its surface broken or torn away by the claw, so that the device would fail to extract the cork; but by spacing the claw some distance above the lower end of the body I obtain a guide-surface 19, which prevents the cork from turning when engaged by the claw and guides it upward into the neck of the bottle, thereby avoiding the risk of breaking the cork, and also rendering the operation of withdrawing it more easy.

By providing the device with two claws— one above the other, as shown—the device is rendered more certain in its action, for if the upper claw should engage the cork when it is crosswise the neck of the bottle (if there were no lower claw) a portion of the cork would be liable to be torn out and the cork not extracted; but with the two claws, if the first one should loosen its hold on the cork the cork would be turned thereby, so as to bring it parallel with the body and in contact with the lower claw, so that the cork will with certainty be extracted.

The device can be used for extracting corks from full bottles, jugs, &c., or from empty ones in which the cork has been pushed inward into the same.

In withdrawing the cork from full bottles, jugs, &c., or from bottles in which the cork has lodged in the neck thereof, the cork is to be first forced down into the bottle by placing the tapering end of the handle upon the cork and applying pressure upon the head 15, when the cork will be forced into the bottle, after which it can be removed as hereinbefore described.

It is obvious that with a handle so constructed the device may be employed as a corkscrew, if so desired, as a cork may be pushed downward into the body of the bottle by means of the handle and be afterward removed by the aid of the body of the device.

Having thus described my invention, I claim as new and desire to secure by Letters Patent—

1. An improved cork-extractor, comprising a flat strip of suitable material provided with two claws, one above the other, the lower one being a distance from the lower end of the strip to form a bearing below the claw for the cork, and a handle secured to the upper end of the strip, substantially as shown and described.

2. As a new article of manufacture, a cork-extractor consisting of the flat metal strip 10, provided with the claws 13 and 14, one above the other, the lower one 13 being a distance from the end to form a bearing 19 for the cork, and the handle 12, having one end tapering from the center outward and provided with the head 15 at its other end, as specified.

BERNARD TORMEY.

Witnesses:
J. F. ACKER,
C. SEDGWICK.